US007503567B2

(12) United States Patent
Frankie

(10) Patent No.: US 7,503,567 B2

(45) Date of Patent: Mar. 17, 2009

(54) AUTOMATED WHEELCHAIR

(76) Inventor: Thomas T. Frankie, 525 Torrey Point Rd., Del Mar, CA (US) 92014

( * ) Notice: Subject to any disclaimer, the term of this patent is extended or adjusted under 35 U.S.C. 154(b) by 105 days.

(21) Appl. No.: 11/787,620

(22) Filed: Apr. 16, 2007

(65) Prior Publication Data

US 2008/0251300 A1 Oct. 16, 2008

(51) Int. Cl.
*B62B 5/02* (2006.01)

(52) U.S. Cl. ........................................ 280/5.2; 180/8.2

(58) Field of Classification Search .................. 280/5.2; 180/8.2

See application file for complete search history.

(56) References Cited

U.S. PATENT DOCUMENTS 4,061,199 A * 12/1977 Last ........................... 180/8.2
5,492,390 A * 2/1996 Kugelmann, Sr. ............ 301/5.1
5,812,978 A * 9/1998 Nolan ........................ 704/275
5,839,795 A * 11/1998 Matsuda et al. .............. 301/5.1
6,328,120 B1 * 12/2001 Haussler et al. .............. 180/8.3
D540,503 S * 4/2007 Tsang ......................... D34/28
7,380,618 B2 * 6/2008 Gunderson et al. ........... 180/8.2
2004/0032119 A1 * 2/2004 Tran et al. ................... 280/755
2005/0279540 A1 * 12/2005 Wisner et al. .............. 180/65.1

* cited by examiner

*Primary Examiner*—Paul N Dickson
*Assistant Examiner*—Tashiana Adams
(74) *Attorney, Agent, or Firm*—John R. Ross; John R. Ross, III

(57) ABSTRACT

An automated wheelchair for moving over a contact surface. The automated wheelchair includes an operator chair for seating the wheelchair operator, a control computer, an operator input device for transmitting operator inputs to the control computer, and two wheelchair wheels for propelling the wheelchair. Each wheelchair wheel includes extendable and retractable spokes. The extension and retraction of each spoke is controlled by a motor. At the ends of each spoke are contact sensor devices. The control computer is programmed to receive inputs transmitted from the contact sensor devices to record contact position data. The control computer generates and sends control signals to each spoke motor in response to the operator inputs and in response to the contact position data generated by the contact sensor devices.

21 Claims, 16 Drawing Sheets

AUTOMATED WHEELCHAIR

The present invention relates to wheelchairs, and in particular, to automated wheelchairs.

BACKGROUND OF THE INVENTION

Wheelchair usage has received recent attention in the media. It has been estimated that currently approximately 2 million Americans use wheelchairs. This number is expected to grow dramatically as the baby boomer generation grows elderly, as the population increases and as the age of life expectancy increases. Also, there has been recent media coverage on injured veterans from the war in Iraq and on mobility assistance devices such as wheelchairs and prosthetic limbs. However, despite recent improvements in technology and intense recent interest in wheelchairs, the modern wheelchair varies just slightly from traditional designs. Most importantly modern wheelchairs are incapable of performing tasks that non-wheelchair users take for granted continuously throughout the day. For example, prior art wheelchairs are incapable of going over a curb, up or down a set of stairs or traveling over rough terrain. Consequently, the wheelchair bound operator is continuously reminded of his predicament and is forced to adjust his daily existence to fit into a society that has been seemingly designed without consideration for wheelchair bound people.

What is needed is a better automated wheelchair.

SUMMARY OF THE INVENTION

The present invention provides an automated wheelchair for moving over a contact surface. The automated wheelchair includes an operator chair for seating the wheelchair operator, a control computer, an operator input device for transmitting operator inputs to the control computer, and two wheelchair wheels for propelling the wheelchair. Each wheelchair wheel includes extendable and retractable spokes. The extension and retraction of each spoke is controlled by a motor. At the ends of each spoke are contact sensor devices. The control computer is programmed to receive inputs transmitted from the contact sensor devices to generate a terrain profile. The control computer generates and sends control signals to each spoke motor in response to the operator inputs and in response to the terrain profile generated by the contact sensor devices. In a preferred embodiment the contact sensor devices are pressure sensor devices. Also in a preferred embodiment, rotatable pneumatic wheels are attached to both ends of each spoke. Preferably, a brake is applied to at least one pneumatic wheel per wheelchair wheel while the wheelchair is moving over the contact surface. Preferably, the automated wheelchair is capable of moving over a variety of contact surface types, including: a set of stairs with uniform rise to run ratio, a set of stairs with non-uniform rise to run ratio, a set of straight stairs, a set of curved stairs, over a curb or over rough terrain.

DETAILED DESCRIPTION OF THE PREFERRED EMBODIMENTS

Figure 1:
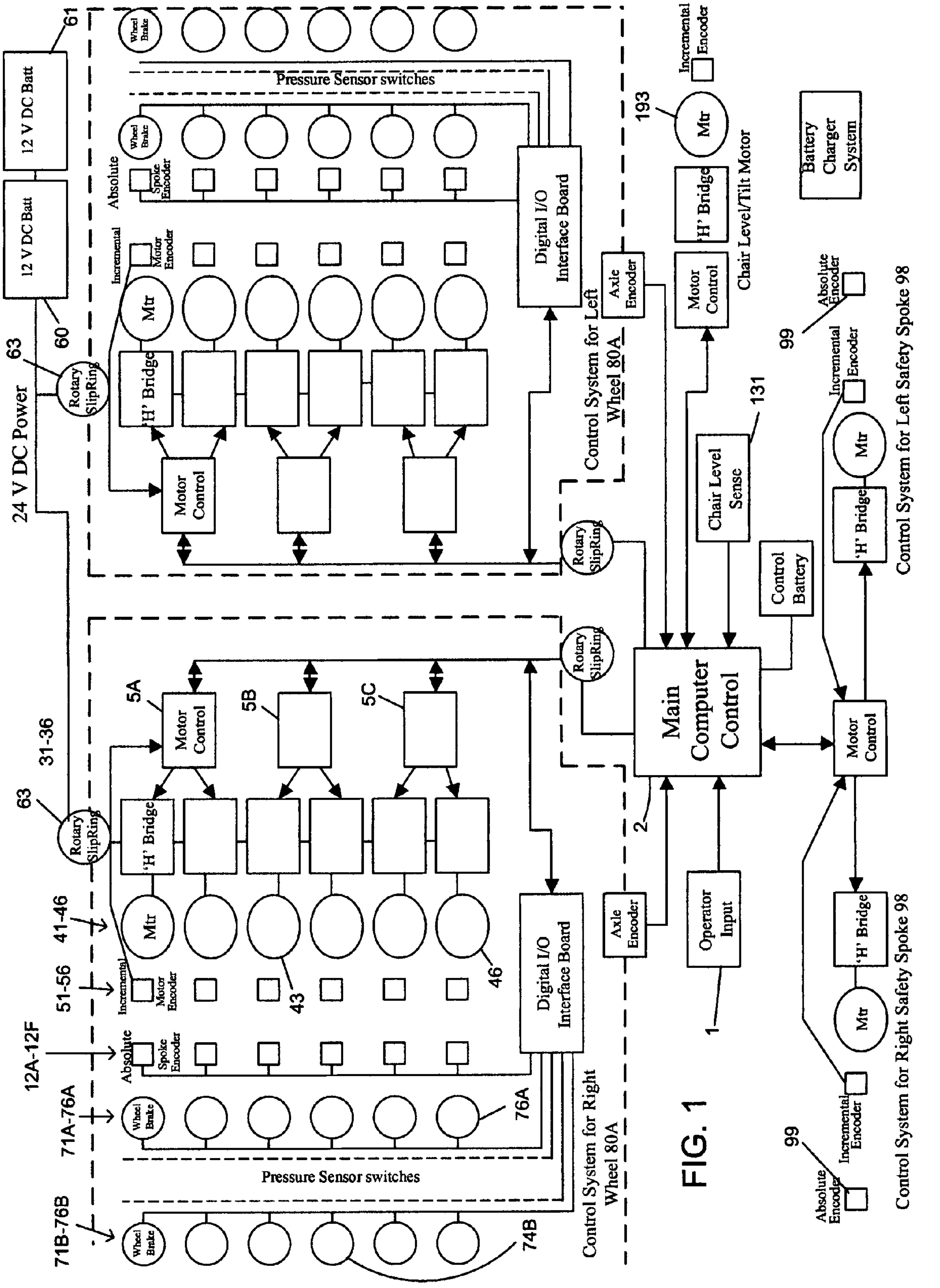
FIG. 1 shows a block diagram of a preferred control system for a preferred embodiment of the present invention
Figure 23:
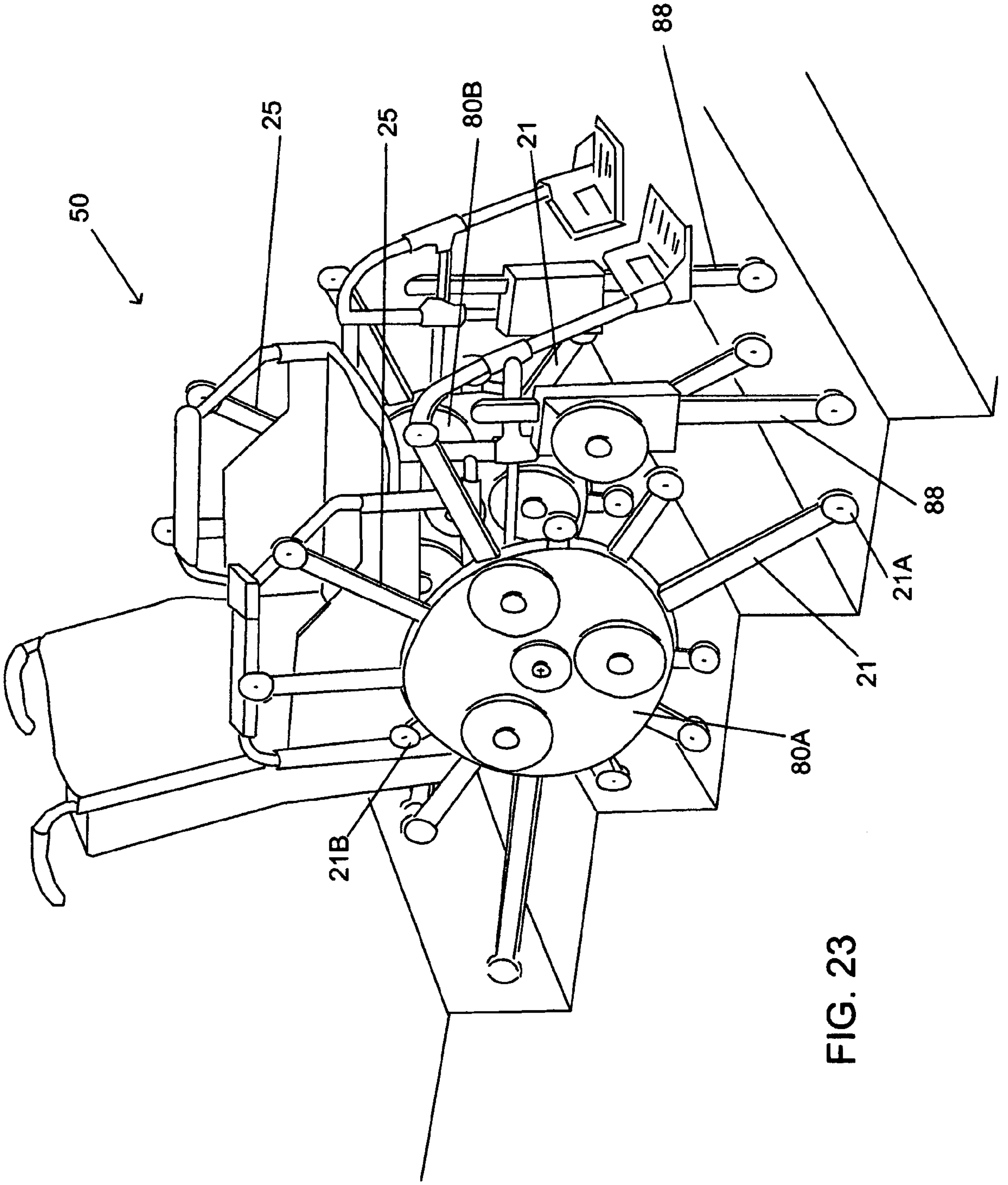
FIG. 23 shows a perspective view of a preferred embodiment of the present invention.

FIG. 23 shows a perspective view and FIG. 1 shows a block diagram of a preferred embodiment of the present invention.

Main computer controller 2 receives operator inputs via operator input device 1. Corresponding control signals are sent to wheels 80A and 80B. Wheels 80A and 80B each include 6 spokes 21-26 that are controlled via motors 41-46 (see also FIG. 1). At each end of each spoke are pneumatic wheels. For example, pneumatic wheels 21A and 21B are attached to opposite ends of spoke 21. Each pneumatic wheel includes a pressure sensor. When a pneumatic wheel makes contact with a surface, the pressure within the wheel increases and a signal is sent back to main computer controller 2. Main computer controller 2 records this data. The data includes the angle of the spoke and the extension of the spoke when surface contact was made. Main computer controller 2 is programmed to compile this data received from pressure sensors and to utilize this data to calculate a terrain profile. Then, main computer controller 2 sends appropriate control signals to motors 41-46 to move the spokes 21-26 in an appropriate fashion so that the wheelchair moves in its intended manner (for example, upstairs, downstairs, over rough terrain, to the left, to the right, forward or backwards). As wheelchair 50 continues its movement, data is constantly being stored by main computer controller 2 and a more accurate terrain profile is constantly being created.

FIGS. 2-16 show a side view of wheelchair 50 so that only wheel 80A is visible. It should be understood that wheel 80B is on the opposite side (left side) of wheelchair 50. For the sequence of events outlined in FIGS. 2-16 for climbing stairs, as components on wheel 80A are moved, corresponding components on wheel 80B will be moved in a similar fashion. For example, if spoke 21 on wheel 80A is moved 3 inches towards the floor, similarly spoke 21 on wheel 80B will also be moved approximately 3 inches towards the floor. Likewise if a brake is applied to pneumatic wheel 23A for wheelchair wheel 80A, similarly a brake is applied to pneumatic wheel 23A for wheelchair wheel 80B. Also, safety spoke 88 has its twin on the opposite side and both move in coordination.

Safety Spokes

In a preferred embodiment, safety spokes 88 do not lift or propel chair 50. Rather, they are provided for extra stability in case the operator should shift his weight in a large motion or attempt to exit the chair. Or, also in case of an external person applying excessive loads which may tip the chair.

Wheelchair Wheels

Figure 17A:
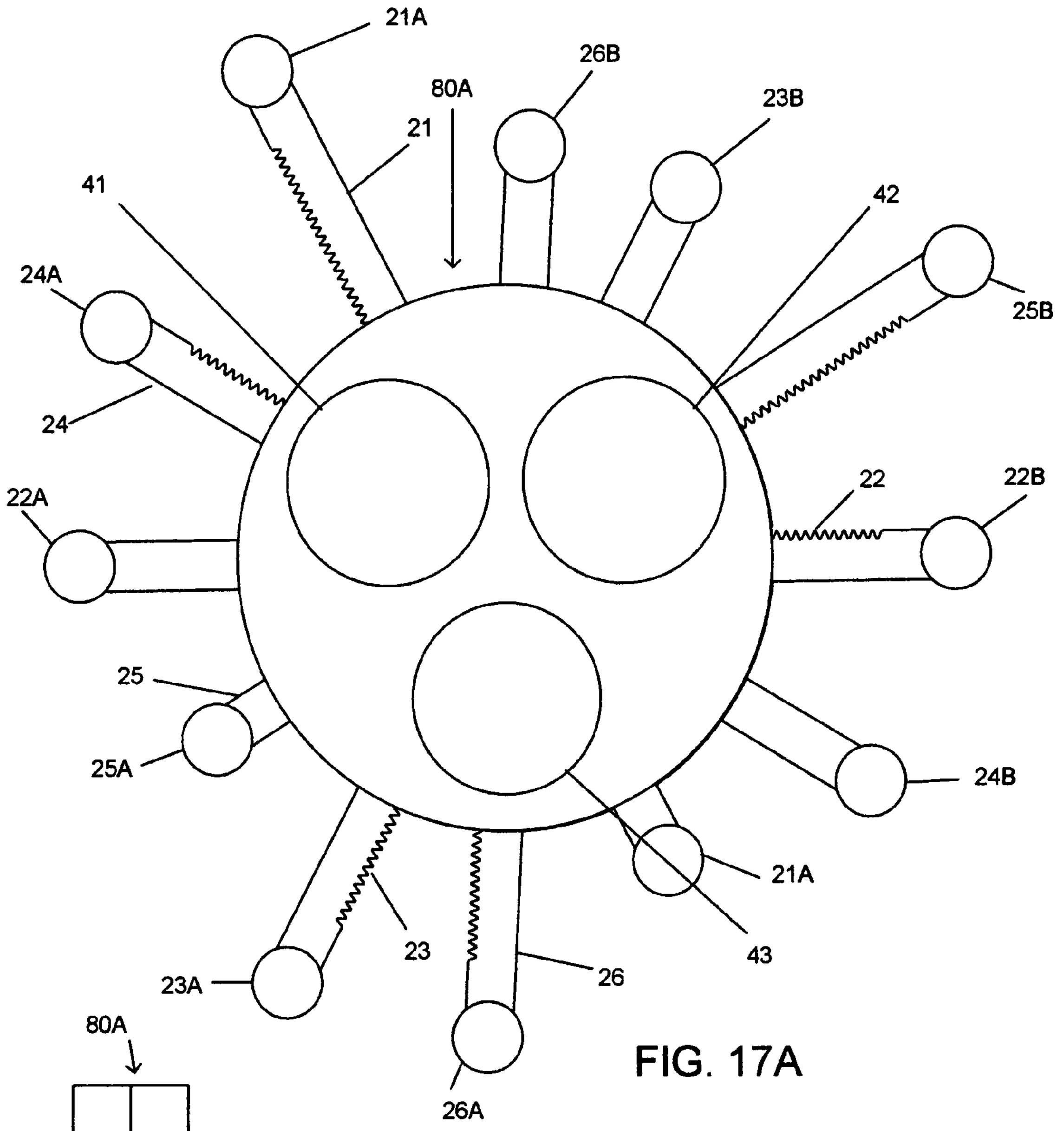
FIGS. 17A-17B show a preferred wheelchair wheel with spokes.
Figure 17B:
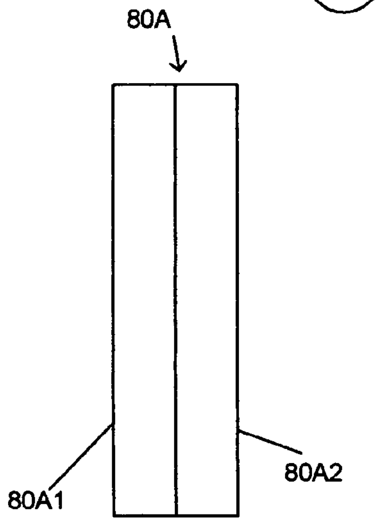
Figure 22:
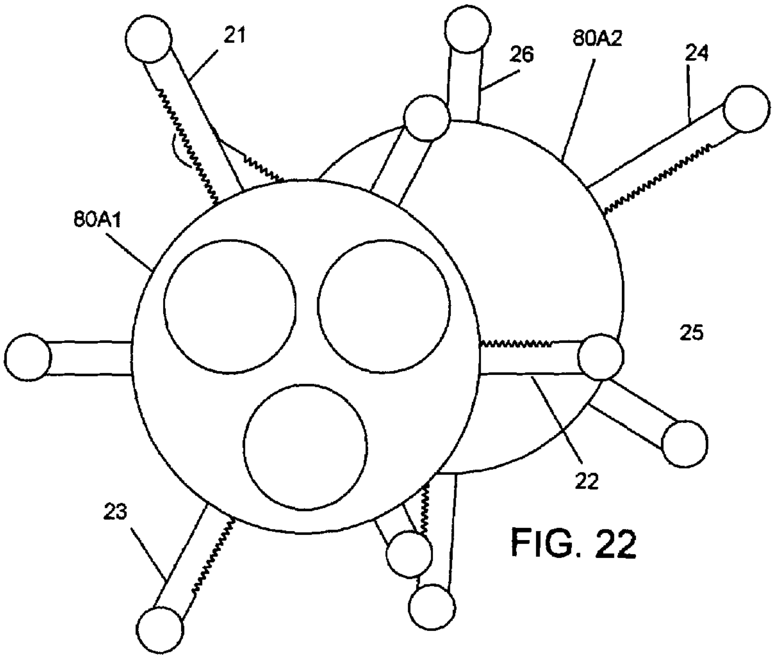

FIGS. 17A and 17B show a preferred wheelchair wheel 80. Wheelchair wheel 80A includes wheel-half 80A1 and wheel-half 80A2. Preferably, wheelchair wheel-halves 80A1 and 80A2 are appropriately aligned and then bolted together (FIG. 17B, FIG. 22 and FIG. 17A).

Figure 18:
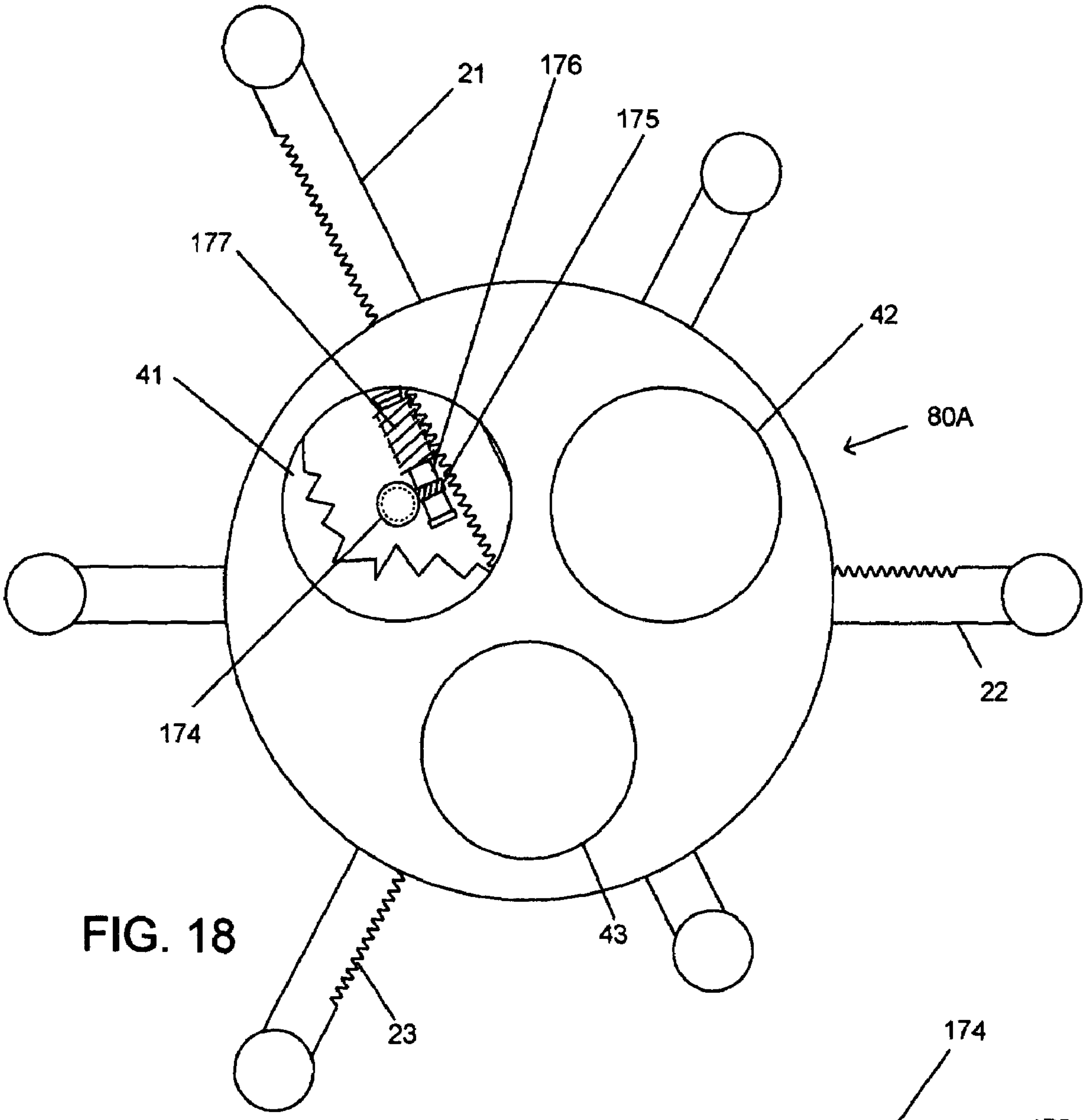
FIG. 18 shows a preferred wheel.

FIG. 18 shows details of wheel-half 80A1. Motors 41, 42 and 43 are mounted onto wheel-half 80A1. FIG. 18 shows a cut-out view of the gearing underneath motor 41 to better explain the operation of wheel 80.

Figure 19:
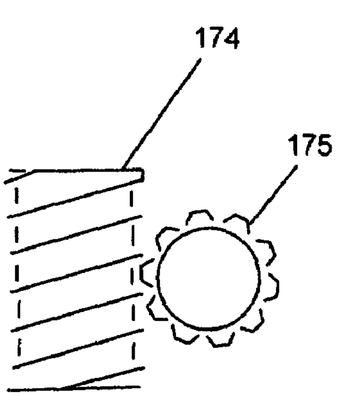
FIG. 19 shows preferred gearing.
Figure 20:
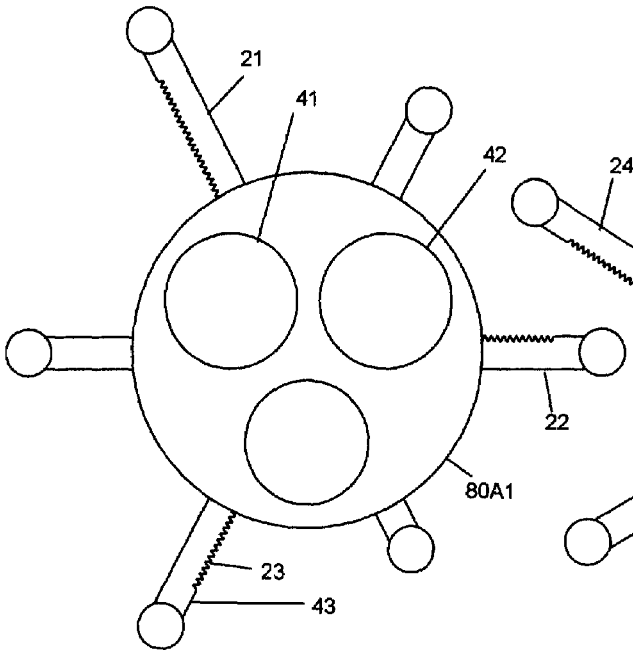
FIGS. 20-22 show details of a preferred wheelchair wheel.
Figure 21:
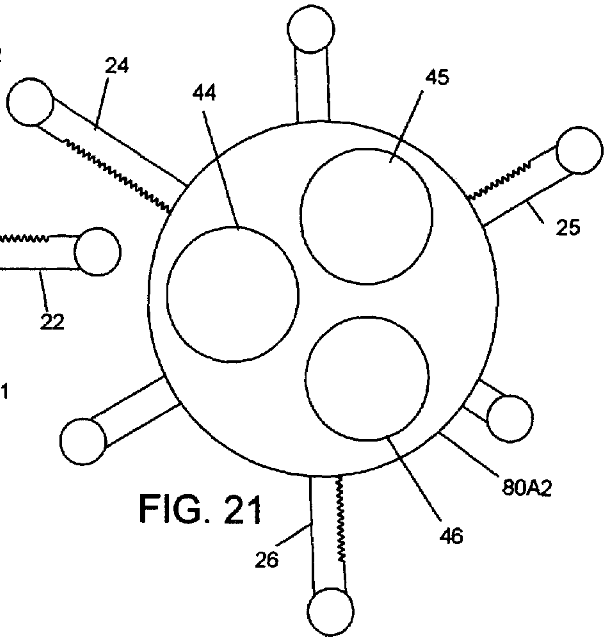

As described below in reference to FIGS. 1-16, motor 41 controls the motion of spoke 21. Motor 41 turns gear 174 in response to commands from main computer controller 2. Gear 174 meshes with gear 175 (see also FIG. 19). Worm gear 177 is connected to gear 175 via common axis 176. Worm gear 177 meshes with teeth on spoke 21.

To control the motion of spoke 21, motor 41 turns gear 174. The turning of gear 174 causes gear 175 to also turn. The turning of gear 175 causes axis 176 to turn which also causes worm gear 177 to turn. The turning of worm gear 177 causes spoke 21 to extend. The direction of extension depends upon the direction of turning of worm gear 177.

At the end of spokes 21-26 are rotatably attached pneumatic wheels 21A-26B (FIG. 17). Each pneumatic wheel is free to rotate unless a brake has been applied to the wheel to prevent its rotation. In one preferred embodiment, at least two pneumatic wheels with brakes applied are in contact with a surface at any given moment. For example, in FIG. 2, brakes 72A, 75A, and 73A (FIG. 1) have been applied to pneumatic wheels 22A, 25A and 23A respectively. By applying a brake to the pneumatic wheels, wheelchair 50 achieves traction on the floor and is able to move backwards as wheels 80A and 80B rotate counterclockwise and forwards as wheels 80A and 80B rotate clockwise.

Climbing Stairs

An operation of a preferred embodiment of the present invention climbing stairs is described by reference to FIGS. 2-16.

Figure 2:
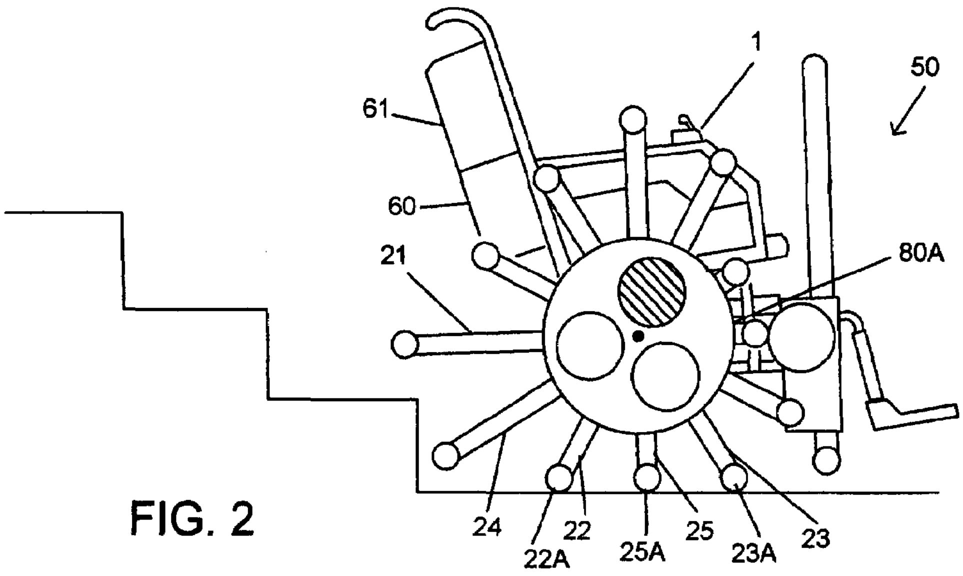
FIGS. 2-16 show a preferred embodiment of the present invention climbing stairs.

In FIG. 2, the user has turned “on” wheelchair 50 via operator input device 1 (see also FIG. 1). Absolute spoke encoders 12 transmit the positions of spokes 21-26 to main computer control 2. Absolute spoke encoders 99 transmit the positions of safety spokes 98 to main computer control 2. Chair level sensor 131 transmits the current chair level of the wheelchair. Main computer control 2 also accesses its memory 14 to check the last known position of wheelchair 50 components and the known terrain surrounding wheelchair 50.

Figure 3:
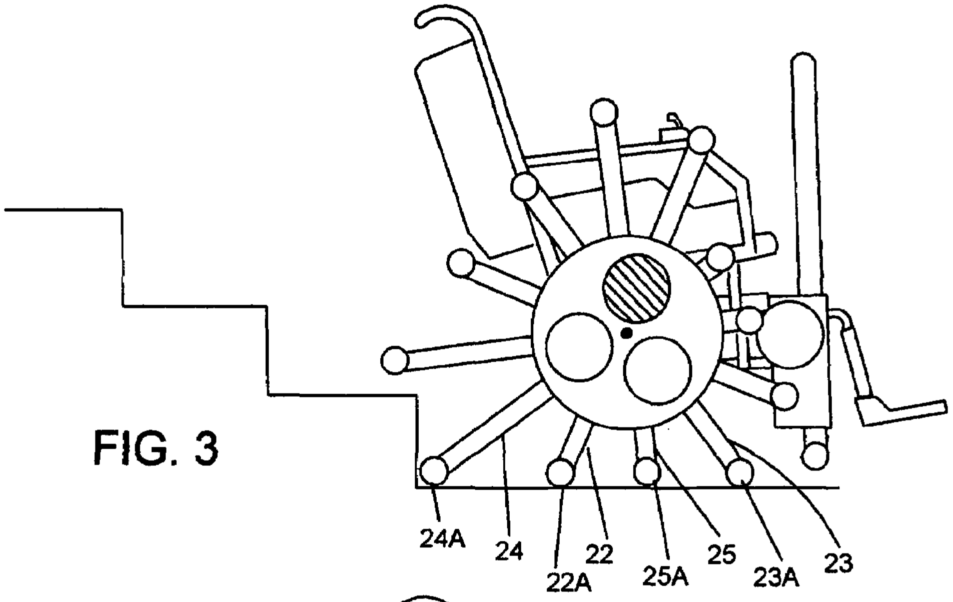

In FIG. 3, the user has moved a joystick located on operator input device 1 backwards. This has caused a signal to be sent from operator input device 1 to main computer control 2. Main computer control 2 has then sent a corresponding signal to motor controllers 5A-5C (FIG. 1) to control the movement of wheelchair wheels 80A and 80B.

Proportional Integral Differential (PID) Servo Control System to Control Wheelchair Wheel Movement As shown in FIG. 1, each motor controller 5A-5C sends control signals to two motors through a pair of H-Bridges. For example, motor controller 5A sends control signals through H-Bridges 31 and 32 to motors 41 and 42. Electricity from batteries 60 and 61 is routed through slip rings 63 to the H-Bridges. Then the H-Bridges proportion the 24V DC power from batteries 60 and 61 to the motors. Incremental motor encoders 51-56 then feed back the position of the motors 41-46 to motor controllers 5A1-5A3. The above described components function as a Proportional Integral Differential (PID) Servo Control System to control motors 41-46.

In FIG. 3, after receiving the control signals from main computer controller 2, motors 41-46 (FIGS. 17A, 17B, 20-22) operate to move wheelchair 50 backwards. For example, motor 43 has extended spoke 23 (FIG. 3) towards the floor, motor 45 has extended spoke 25 towards the floor and motor 42 has retracted spoke 22 into the wheel hub. Brakes 72A and 75A (FIG. 1) are still applied to wheels 22A and 25A. However, brake 73A has been released and wheel 23A is free to rotate. Wheel 24A at the end of spoke 24 has contacted the floor just prior to the first stair. A pressure sensor inside wheel 24A has been tripped and a signal has been sent to main computer controller 2 so that main computer controller 2 can record the contact position of wheel 24A in its memory. Likewise, each pneumatic wheel in contact with a surface is sending its contact information to main computer controller 2 so that main computer controller 2 can calculate a terrain profile. Each pneumatic wheel not in contact with the floor is also sending this non-contact information to the control computer.

Figure 4:
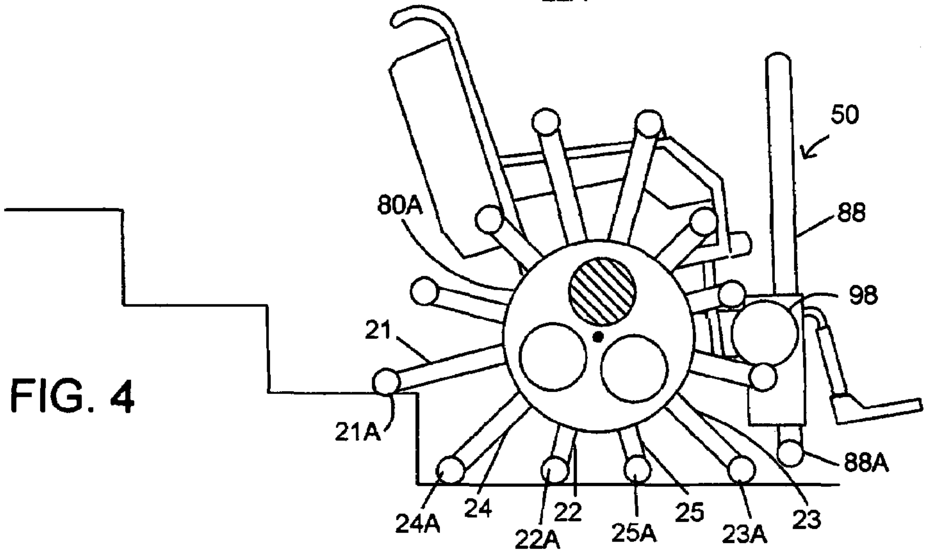

In FIG. 4, wheel 80A has continued its counterclockwise rotation and wheelchair 50 has moved to the left. Spoke 23 has extended towards the floor, wheel 23A is in contact with the floor and is free to rotate. Spoke 25 has extended further towards the floor, wheel 25A is in contact with the floor and wheel brake 75A is applied preventing its rotation relative to the spoke. Spoke 22 has retracted into the wheel hub, wheel 22A is in contact with the floor and wheel brake 72A is applied preventing its rotation. Spoke 24 has retracted into the wheel hub and wheel 24A is in contact with the floor and is free to rotate. Pneumatic wheel 21A of spoke 21 has made contact with the top of the first step of the stairs. This contact information has been transmitted from the pressure sensor switch in wheel 21A to main computer controller 2. Main computer controller 2 is programmed to assume that the top of the first step is horizontal and will begin to retract spoke 21 into the wheel hub as appropriate. Also, from the position shown in FIG. 4, wheelchair 50 will begin to move upward to climb the stairs. In a preferred embodiment, wheelchair 50 includes safety spoke 88. As wheel chair 50 continues to move up the stairs, motor 98 will lower spoke 88 so that pneumatic wheel 88A is always approximately 2 inches above the horizontal surface.

Figure 5:
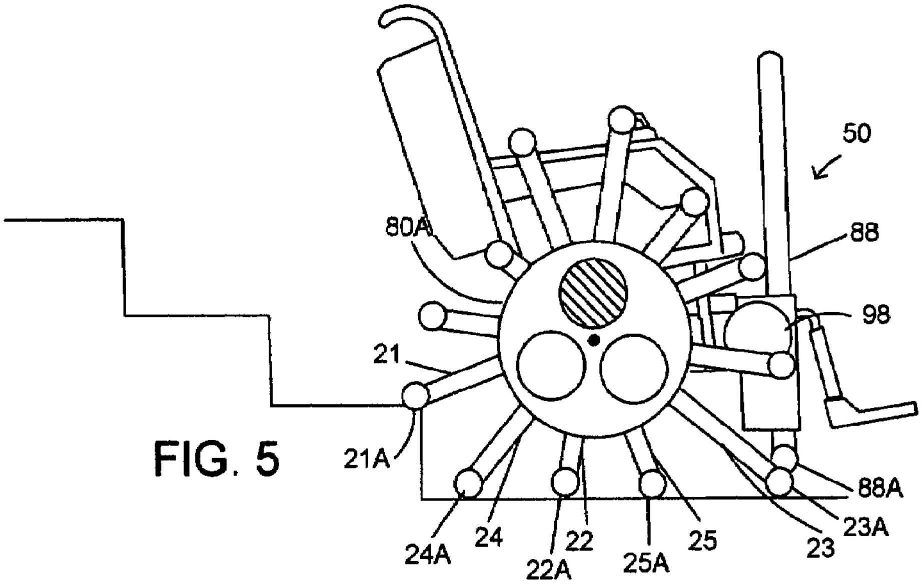

In FIG. 5, wheel 80A has continued its counterclockwise rotation and wheelchair 50 has moved to the left and slightly upward. Motor 193 has kept wheelchair 50 at the operator selected recline angle. Motor 98 has lowered safety spoke 88 so that pneumatic wheel 88A is approximately 2 inches above the floor. Spoke 23 has extended further towards the floor, wheel 23A is in contact with the floor and is free to rotate. Spoke 25 has extended further towards the floor, wheel 25A is in contact with the floor and wheel brake 75A is applied preventing its rotation. Spoke 22 has retracted into the wheel hub, wheel 22A is in contact with the floor and wheel brake 72A is applied preventing its rotation. Spoke 24 has retracted further into the wheel hub and wheel 24A is in contact with the floor and is free to rotate. Spoke 21 has retracted into the wheel hub, wheel 21A is in contact with the step and is free to rotate. The contact information from the pneumatic wheels has been transmitted from their pressure sensor switches to main computer controller 2. Main computer controller 2 is using this information to continue to calculate and update a terrain profile.

Figure 6:
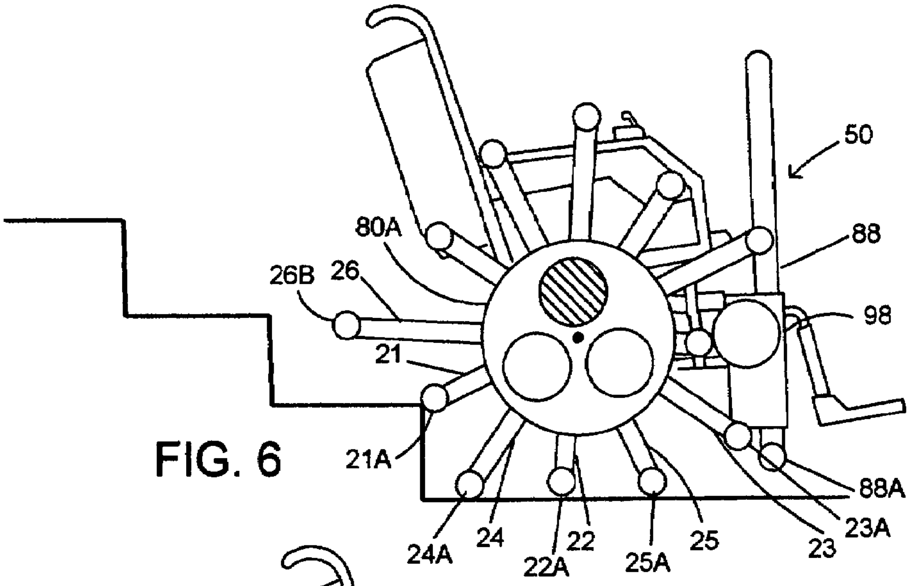

In FIG. 6, wheel 80A has continued its counterclockwise rotation and wheelchair 50 has moved to the left and slightly upward. Motor 193 has kept wheelchair 50 at the operator selected recline angle. Motor 98 has further lowered safety spoke 88 so that pneumatic wheel 88A is approximately 2 inches above the floor. Spoke 26 has fully extended towards the stairs and wheel 26B is extended and searching for the next contact point. Spoke 23 has retracted away from the floor at its full extension and wheel 23A has lifted from the floor. Spoke 25 has extended towards the floor, wheel 25A is in contact with the floor and wheel brake 75A is applied preventing its rotation. Spoke 22 has retracted into the wheel hub, wheel 22A is in contact with the floor and wheel brake 72A is applied preventing its rotation. Spoke 24 has retracted into the wheel hub and wheel 24A is in contact with the floor and is free to rotate. Spoke 21 has retracted further into the wheel hub and wheel 21A is in contact with the step and is free to rotate. It should be noted that as wheel 21A moves to the right it will eventually come to the edge of the step. When that happens, the pressure sensor inside pneumatic wheel 21A will send a signal to main computer controller 2 indicating that the edge of the step has been located. Main computer controller 2 will then send a control signal to motor 41A to move spoke 21 downward along the vertical edge of the step. In FIG. 6, the contact information from the pneumatic wheels has been transmitted from their pressure sensor switches to main computer controller 2. Main computer controller 2 is using this information to continue to calculate and update a terrain profile.

Figure 7:
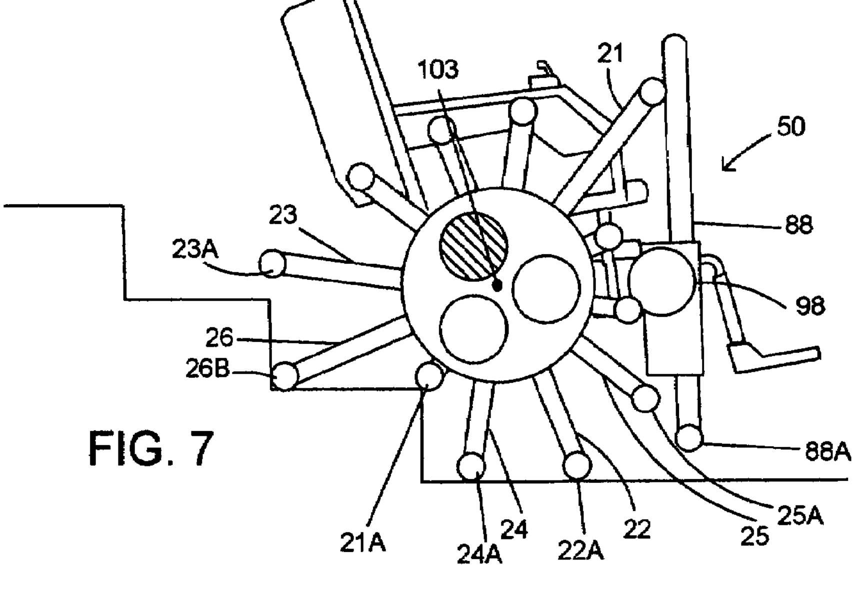

In FIG. 7, at a later time interval, wheel 80A has continued its counterclockwise rotation and wheelchair 50 has moved to the left and slightly upward. Motor 193 has kept wheelchair 50 at the operator selected recline angle. Motor 98 has further lowered safety spoke 88 so that pneumatic wheel 88A is approximately 2 inches above the floor. Spoke 23 has extended to the left and wheel 23B is extended and searching for the next contact point. Spoke 25 has retracted into the wheel hub and is centered about axis 103. Wheel 25A has lifted from the floor. Spoke 22 has extended towards the direction of the floor, lifting wheelchair 50, wheel 22A is in contact with the floor and wheel brake 72A is applied preventing its rotation. Spoke 24 has extended towards the floor, lifting wheelchair 50, and wheel 24A is in contact with the floor and its brake is applied preventing its rotation relative to the spoke. Spoke 21 has retracted into the wheel hub and wheel 21A is in contact with the step and is free to rotate. Wheel 26B of spoke 26 has made contact with the steps and is free to rotate. In FIG. 7, the contact information from the pneumatic wheels has been transmitted from their pressure sensor switches to main computer controller 2. Main computer controller 2 is using this information to continue to calculate and update a terrain profile.

Figure 8:
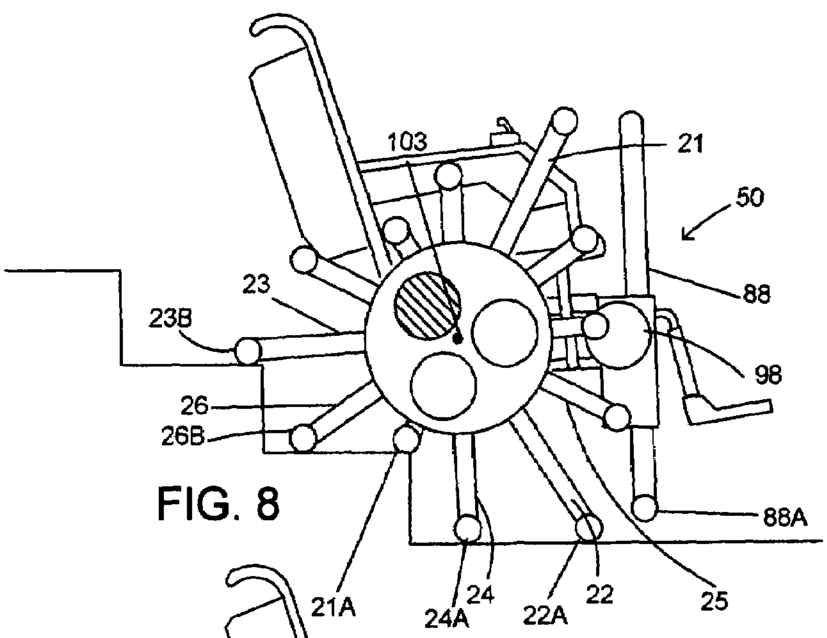

In FIG. 8, wheel 80A has continued its counterclockwise rotation and wheelchair 50 has moved to the left and upward. Motor 193 has kept wheelchair 50 at the operator selected recline angle. Motor 98 has further lowered safety spoke 88 so that pneumatic wheel 88A is approximately 2 inches above the floor. Due to the rotation of wheel 80A, wheel 23B of spoke 23 has made contact with the steps and is free to rotate. Spoke 25 is centered about axis 103. Spoke 22 has extended towards the direction of the floor, wheel 22A is in contact with the floor and is free to rotate. Spoke 24 has extended towards the floor and wheel 24A is in contact with the floor and its brake is applied preventing its rotation. Wheel 21A is in contact with the step and its brake is applied preventing its rotation. Spoke 26 has retracted into the wheel hub and wheel 26B is in contact with the steps and is free to rotate. In FIG. 8, the contact information from the pneumatic wheels has been transmitted from their pressure sensor switches to main computer controller 2. Main computer controller 2 is using this information to continue to calculate and update a terrain profile.

Figure 9:
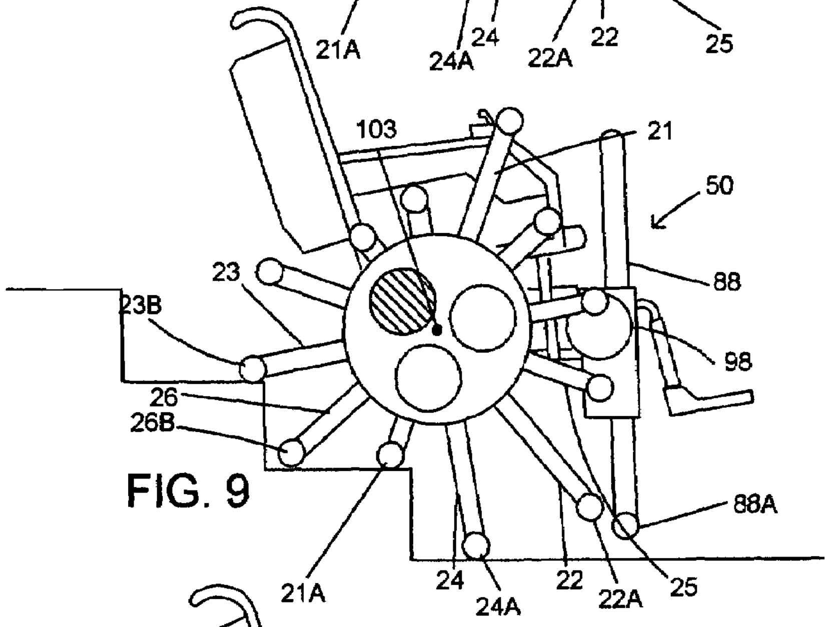

In FIG. 9, wheel 80A has continued its counterclockwise rotation and wheelchair 50 has moved to the left and slightly upward. Motor 193 has kept wheelchair 50 at the operator selected recline angle. Motor 98 has further lowered safety spoke 88 so that pneumatic wheel 88A is approximately 2 inches above the floor. Spoke 23 has retracted into the wheel hub, wheel 23B is in contact with the steps and is free to rotate. Spoke 25 is centered about axis 103. Spoke 22 is fully extended and wheel 22A is no longer in contact with the floor. Spoke 24 has extended towards the floor and wheel 24A is in contact with the floor and its brake is applied preventing its rotation. Wheel 21A is in contact with the step and its brake is applied preventing its rotation. Wheel 26B is in contact with the steps and is free to rotate. In FIG. 9, the contact information from the pneumatic wheels has been transmitted from their pressure sensor switches to main computer controller 2. Main computer controller 2 is using this information to continue to calculate and update a terrain profile.

Figure 10:
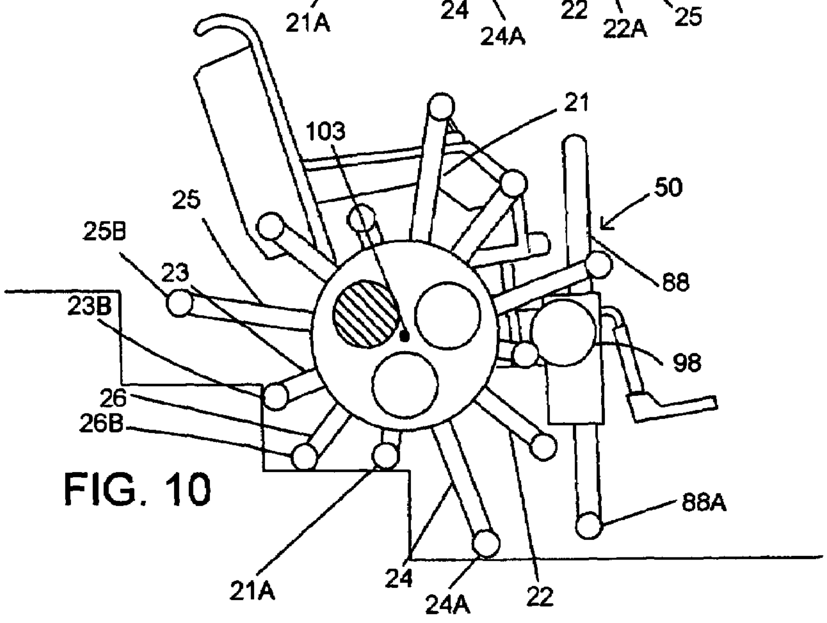

In FIG. 10, wheel 80A has continued its counterclockwise rotation and wheelchair 50 has moved to the left and slightly upward. Motor 193 has kept wheelchair 50 at the operator selected recline angle. Motor 98 has further lowered safety spoke 88 so that pneumatic wheel 88A is approximately 2 inches above the floor. Spoke 23 has retracted into the wheel hub, lost contact with the horizontal face of the step, and then has re-established contact with the riser. Wheel 23B is in contact with the riser and is free to rotate. Spoke 25 has extended to the left and wheel 25B is extended and searching for the next contact point. Spoke 22 is centered about axis 103. Spoke 24 has extended towards the floor and wheel 24A is in contact with the floor and its brake is applied preventing its rotation. Wheel 21A is in contact with the step and its brake is applied preventing its rotation. Wheel 26B is in contact with the steps and is free to rotate. In FIG. 10, the contact information from the pneumatic wheels has been transmitted from their pressure sensor switches to main computer controller 2. Main computer controller 2 is using this information to continue to calculate and update a terrain profile.

Figure 11:
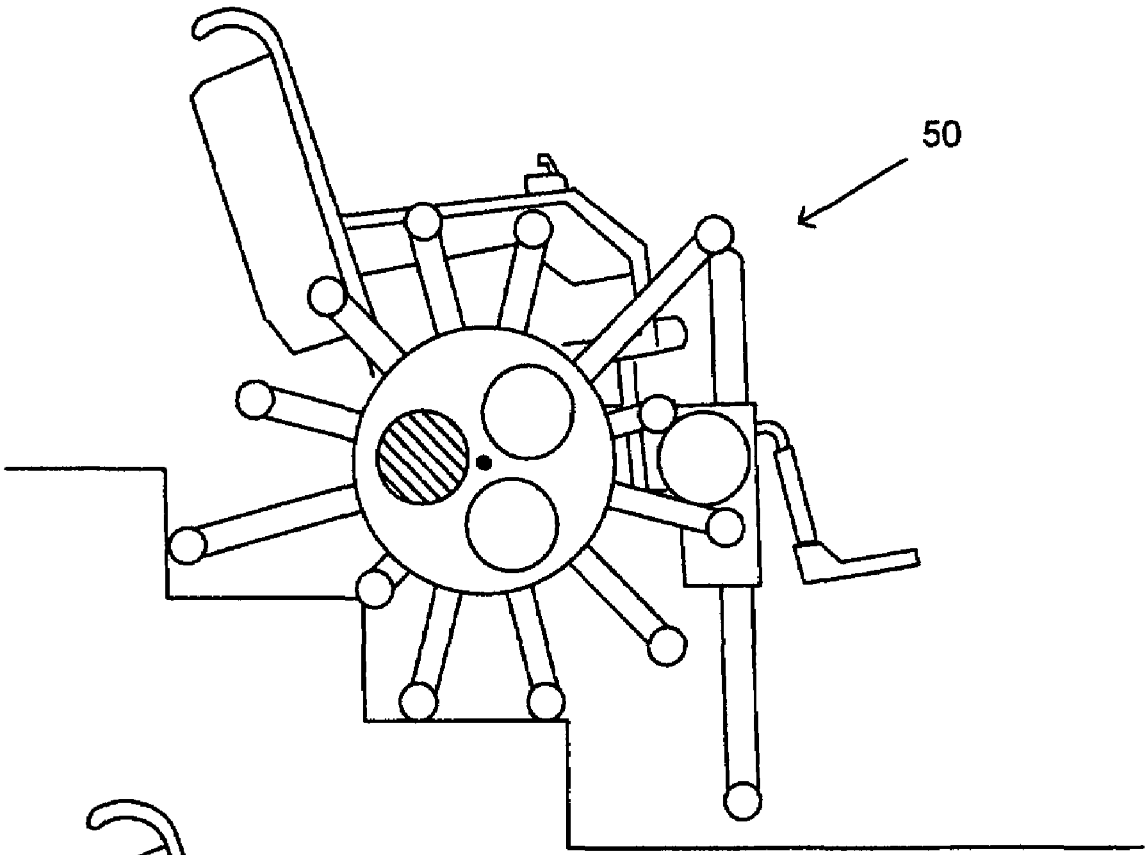
Figure 12:
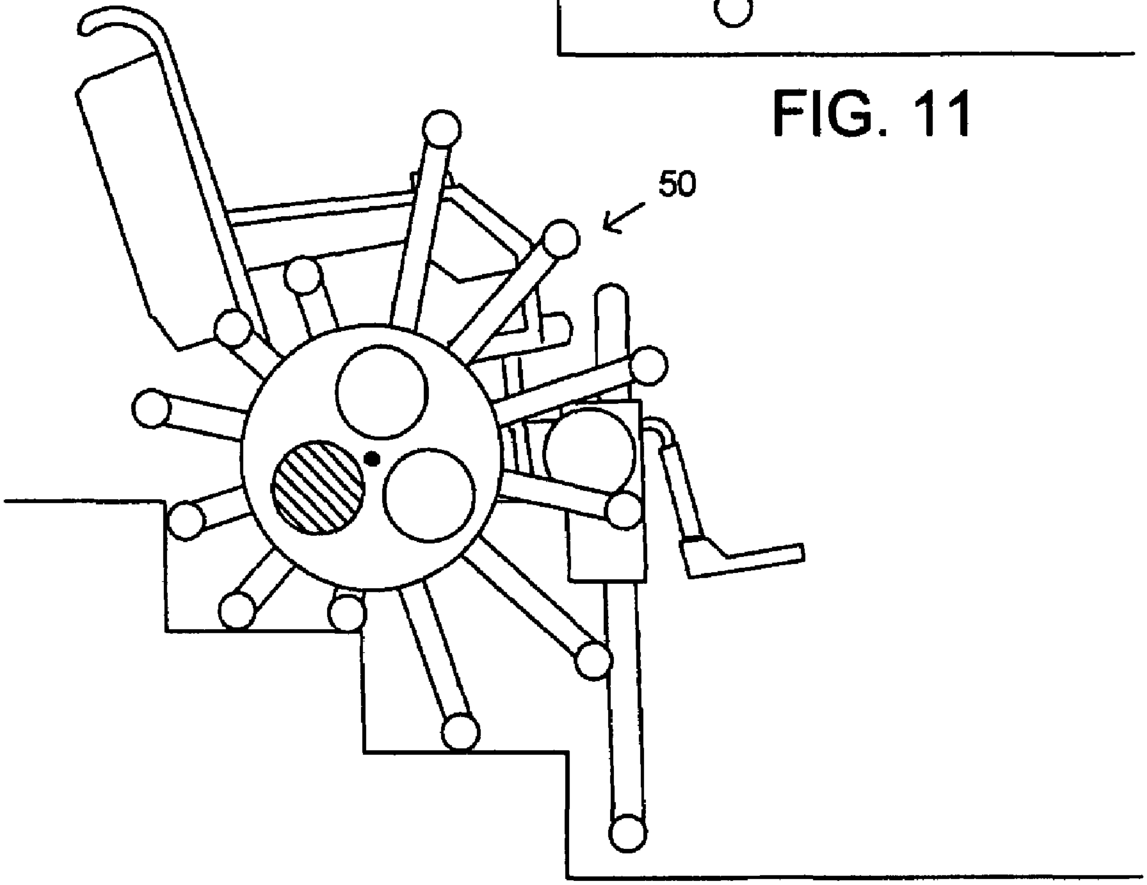
Figure 13:
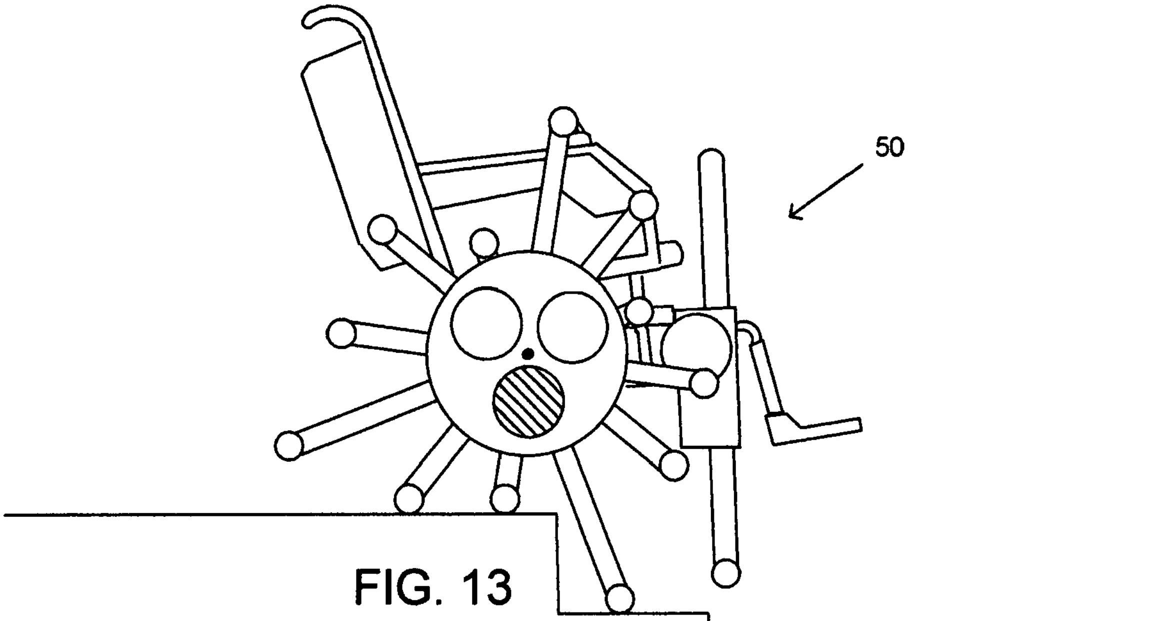
Figure 14:
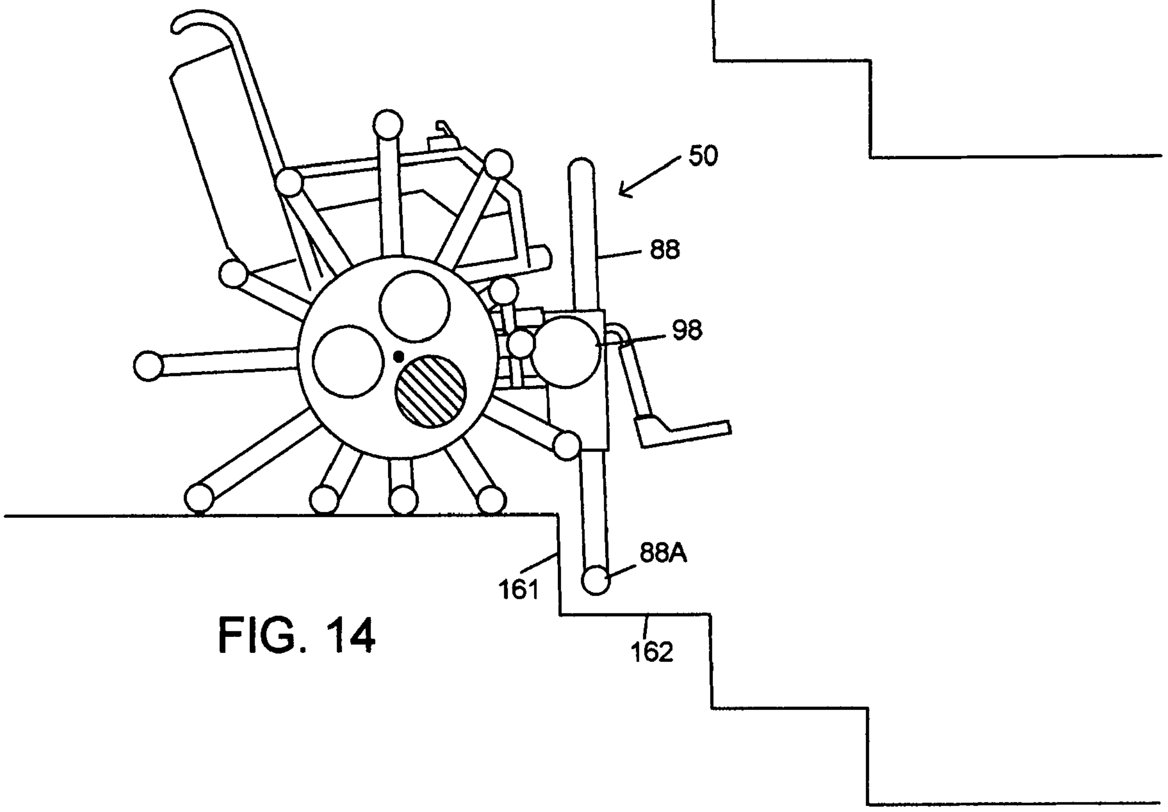
Figure 15:
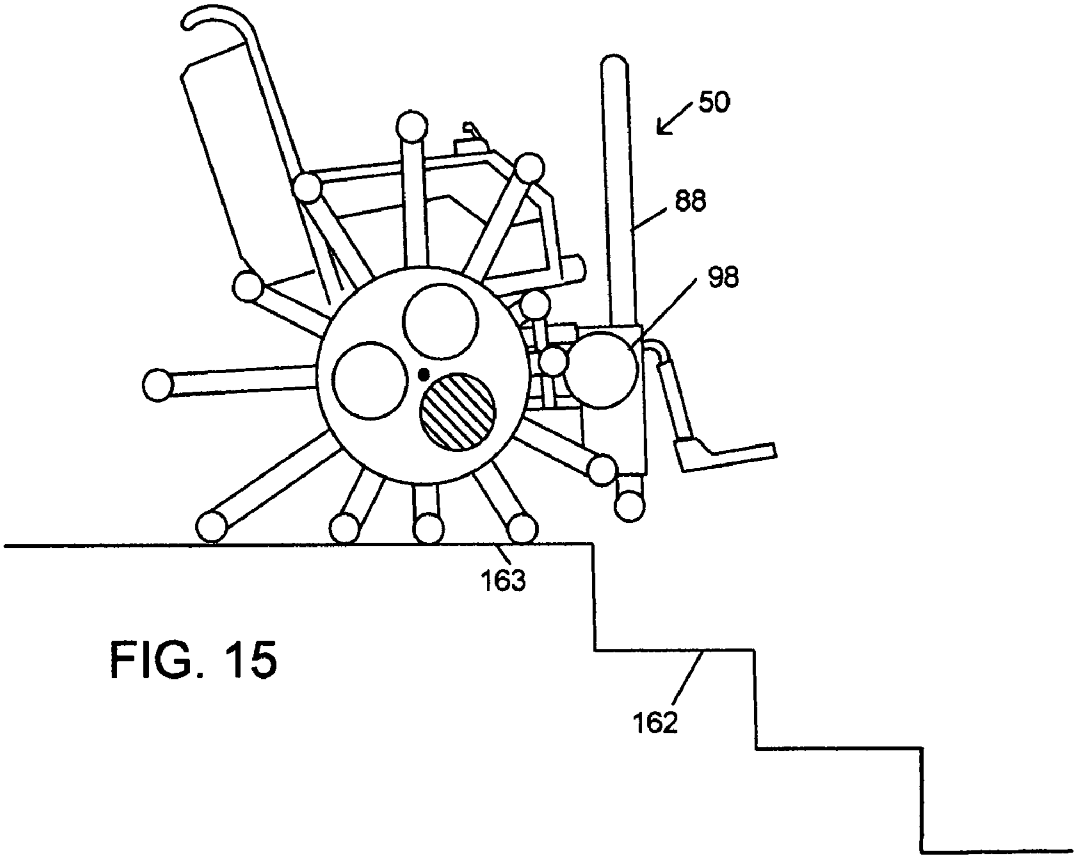
Figure 16:
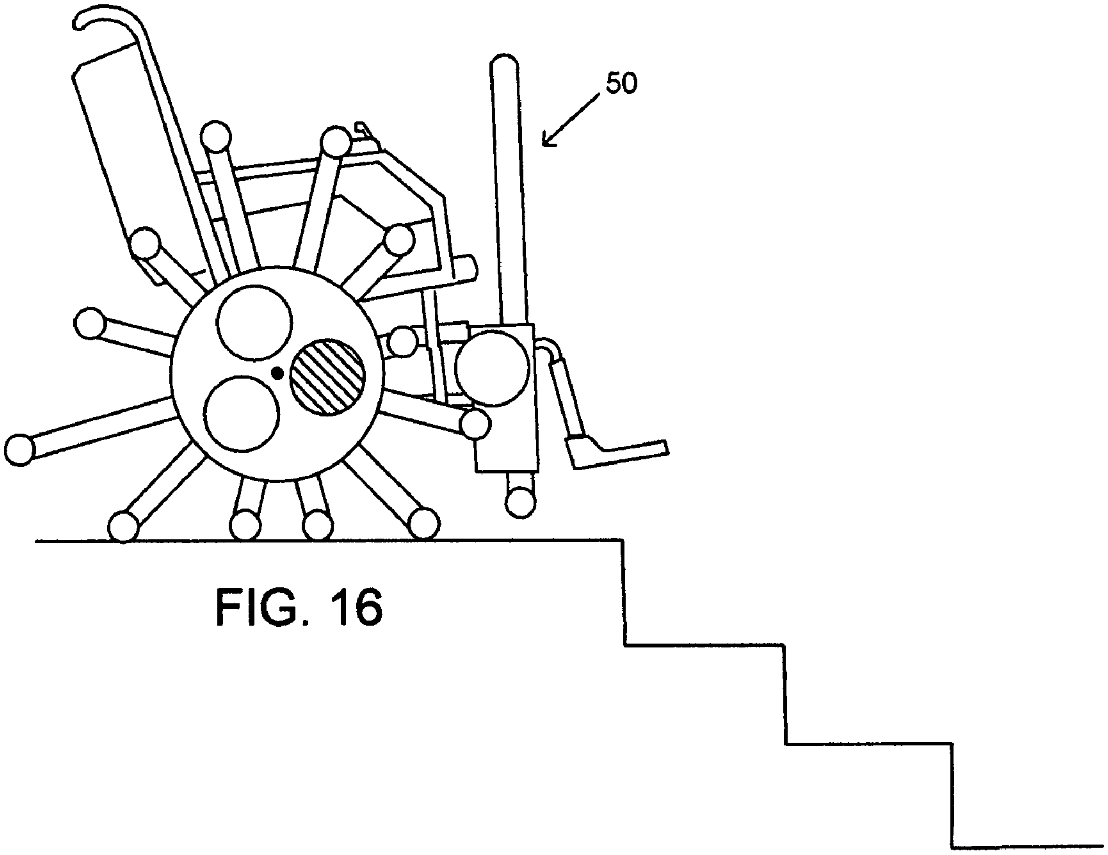

In FIGS. 11-13, wheelchair 50 continues to move up the stairs in a fashion similar to that described above in reference to FIGS. 1-10. FIGS. 14-16 show wheelchair 50 transitioning to the top of the stairs and also illustrate how safety spoke 88 traverses a step as it approaches the vertical edge of the step.

In FIG. 14, wheel 80A has continued its counterclockwise rotation and wheelchair 50 has moved to the left and is at the top of the stairs. Main computer controller 2 has compiled a terrain profile based on sensor information transmitted from the pressure sensor switches in the pneumatic wheels. Therefore, main computer controller 2 knows that safety spoke 88 is approximately 2 inches away from vertical edge 161 of the last step. Motor 98 has maintained the position of safety spoke 88 so that pneumatic wheel 88A is approximately 2 inches above top of horizontal edge 162 of the second to the last step. Wheelchair 50 has briefly stopped at the position shown in FIG. 14.

In FIG. 15, motor 98 has retracted safety spoke 88 upward away from the horizontal edge 162 to a height that is approximately 2 inches higher than floor 163.

In FIG. 16, wheel 80A has continued its counterclockwise rotation and wheelchair 50 has moved to the left along floor 163.

FIGS. 1-16 illustrate clearly how this design of a wheelchair can travel up a set of stairs. Traveling down a set of stairs is done in a similar fashion, except the procedure is followed in a reverse order. For example, FIG. 16 shows wheelchair 50 at the top of the stairs. FIG. 13 shows wheelchair 50 as it begins its descent. FIG. 11 shows wheelchair 50 towards the bottom of the stairs. FIG. 2 shows wheelchair 50 at the bottom of the stairs. Preferably, on descent the operator will indicate "stairs present" so that safety spokes 88 can probe for the first step.

Wheelchair Stand-Up, Tilt and Level

Figure 24:
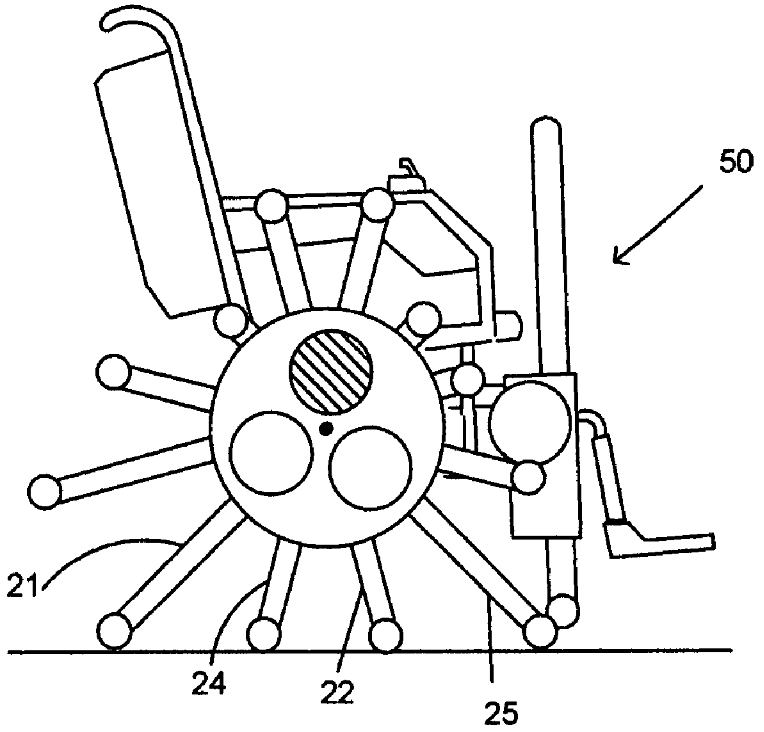
FIGS. 24-25 show an automated wheelchair adjusting its height and tilt of the operator chair.

In a preferred embodiment, wheelchair 50 is capable of rising in height and tilting forward to make it easier for the operator to sit into the wheelchair or to get up from the chair. For example, in FIG. 24 spokes 21, 24, 22 and 25 are extended towards the floor so that wheelchair 50 has risen in height. Also, main computer controller 2 has sent signals to motor 193 (FIG. 1) to tilt wheelchair 50 forward. By being higher and tilted forward, it is easier for the operator to exit from wheelchair 50. Preferably the positioning of wheelchair 50 is initiated by a command from the operator.

Figure 25:
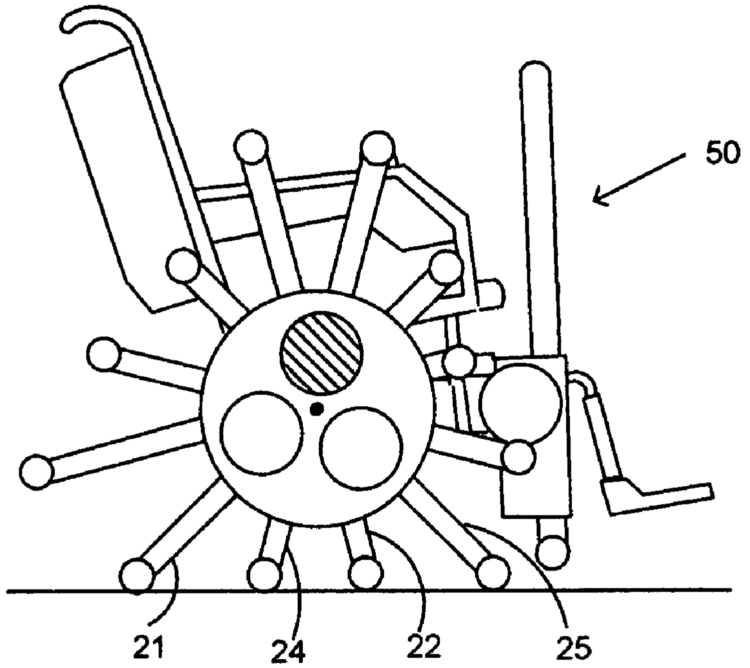

In FIG. 25, the operator has sent control signals so that spokes 21, 24, 22 and 25 have retracted into the wheel hub. This has lowered wheelchair 50. The operator has also tilted wheelchair 50 backwards by sending control signals to motor 193. By having a lower center of mass and by having a seating position that is tilted backwards, the operator is transported more safely.

Traveling Forward Over a Curb

As shown above, wheelchair 50 is capable of traveling backwards up a set of stairs. It is also possible to travel forward over a step, a set of small steps or a curb.

FIGS. 26-30 illustrate a preferred wheelchair 50 traveling forward over a curb. It should be noted that regular stairs are traversed as described in detail above.

Figure 26:
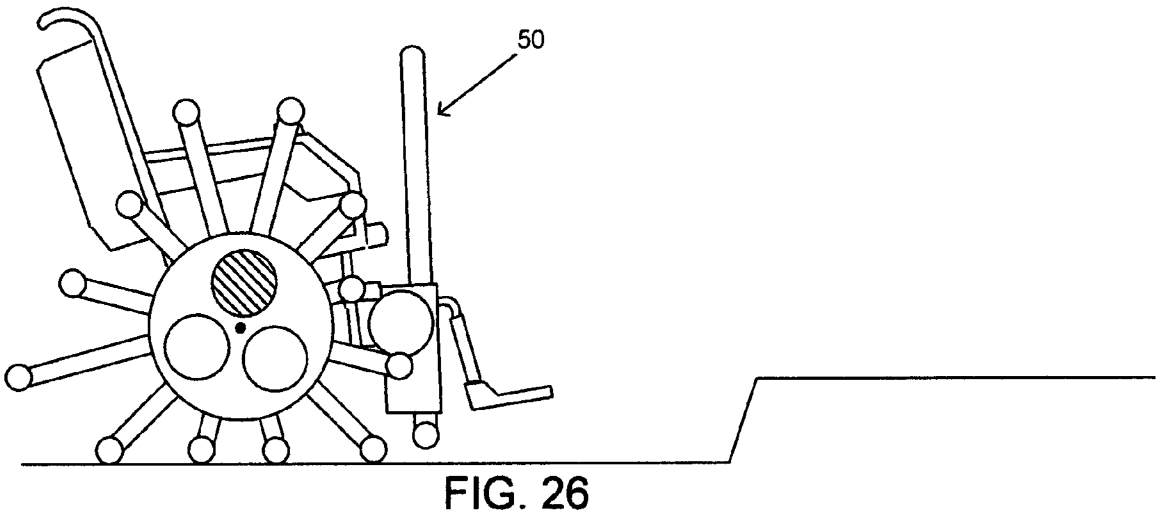
FIGS. 26-30 show an automated wheelchair moving forward over a curb.

In FIG. 26, wheelchair 50 is approaching a curb.

Figure 27:
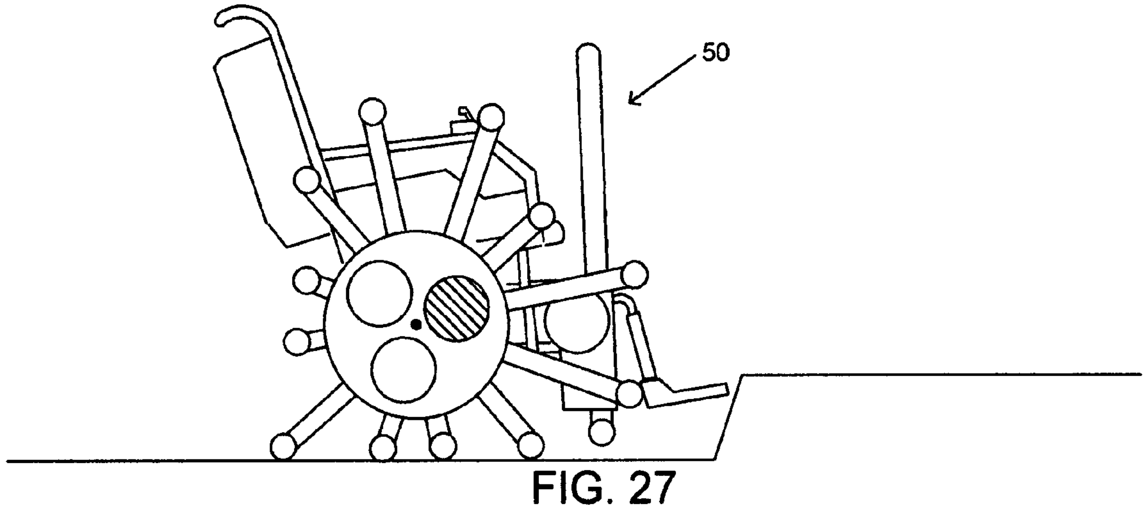

In FIG. 27, wheelchair 50 has almost contacted the curb. At this point, the user inputs instructions via operator input device 1 to raise the wheelchair and to move forward over a curb.

Figure 28:
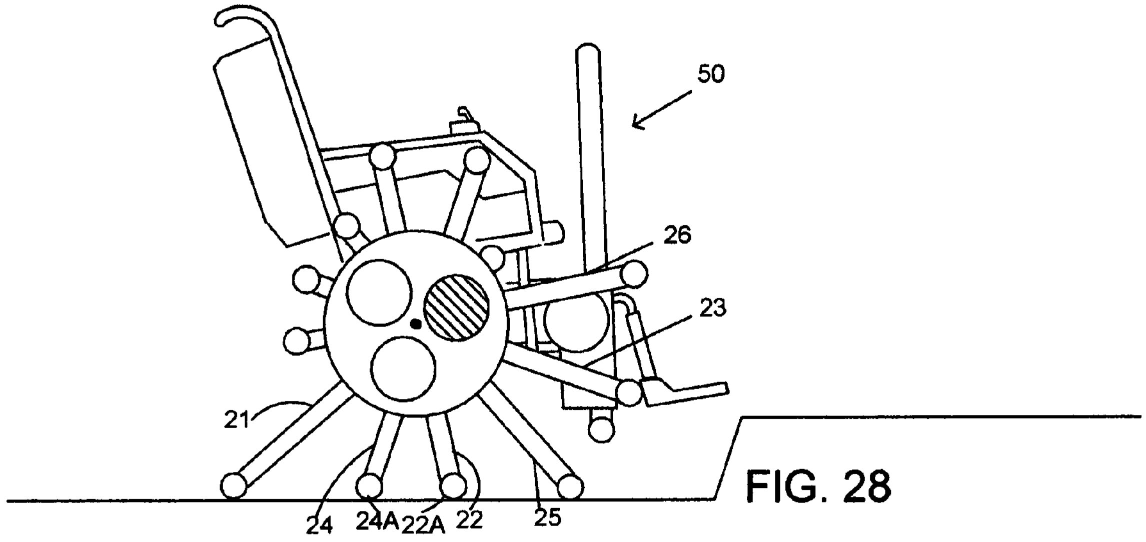

In FIG. 28, spokes 25, 22, 24, and 21 have expanded towards the floor causing wheelchair 50 to rise in height. Brakes continue to be applied to wheels 22A and 24A.

Figure 29:
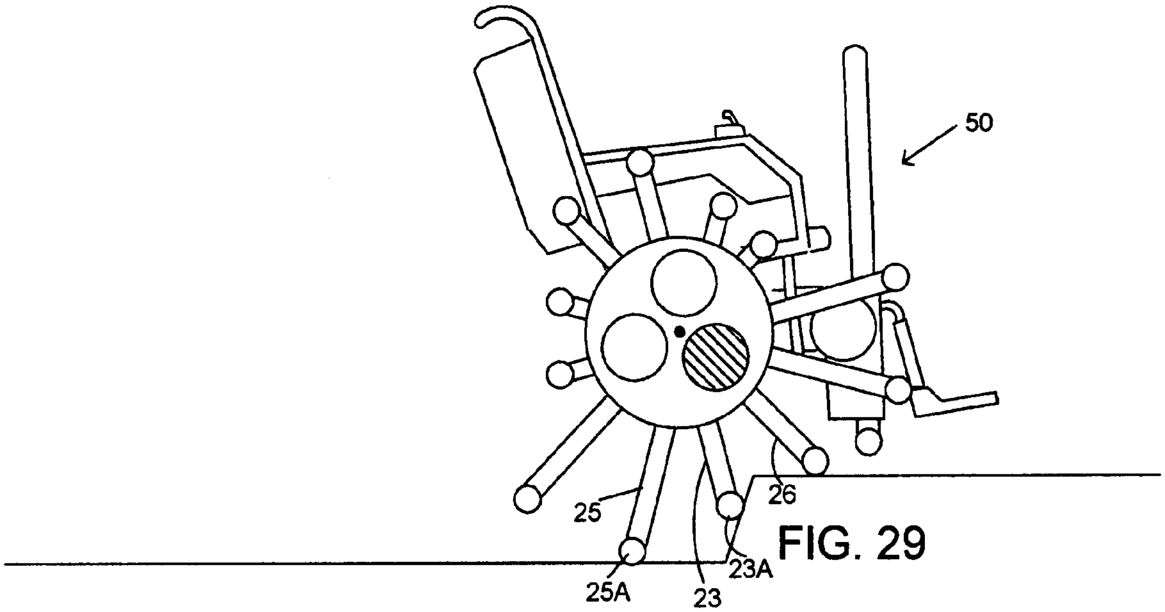

In FIG. 29, wheelchair 50 has moved to the right. Brakes are applied to wheels 23A and 25A.

Figure 30:
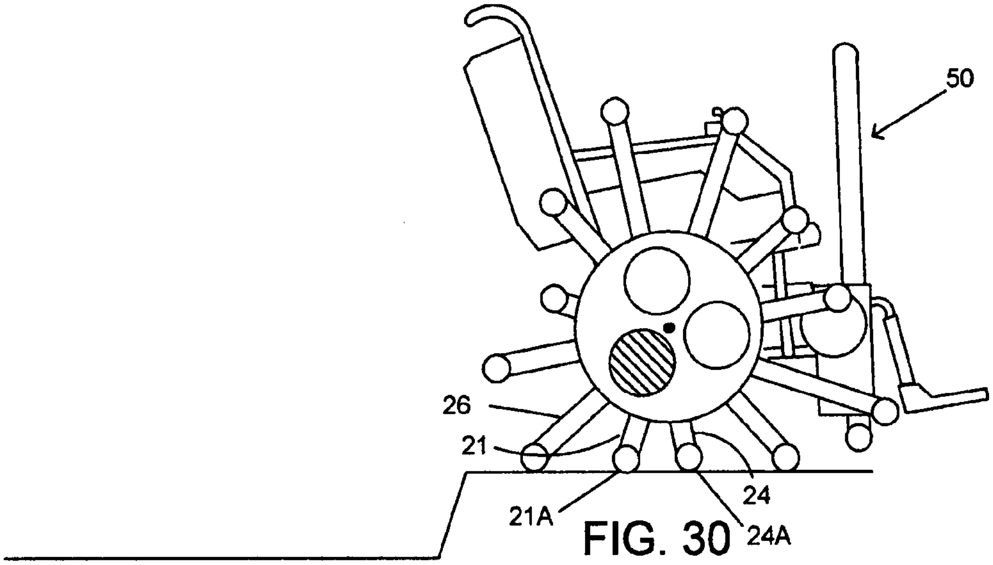

In FIG. 30, wheelchair 50 has moved to the right and has successfully climbed the curb. Brakes are applied to wheels 21A and 24A.

Traveling Over Rough Terrain

Figure 31:
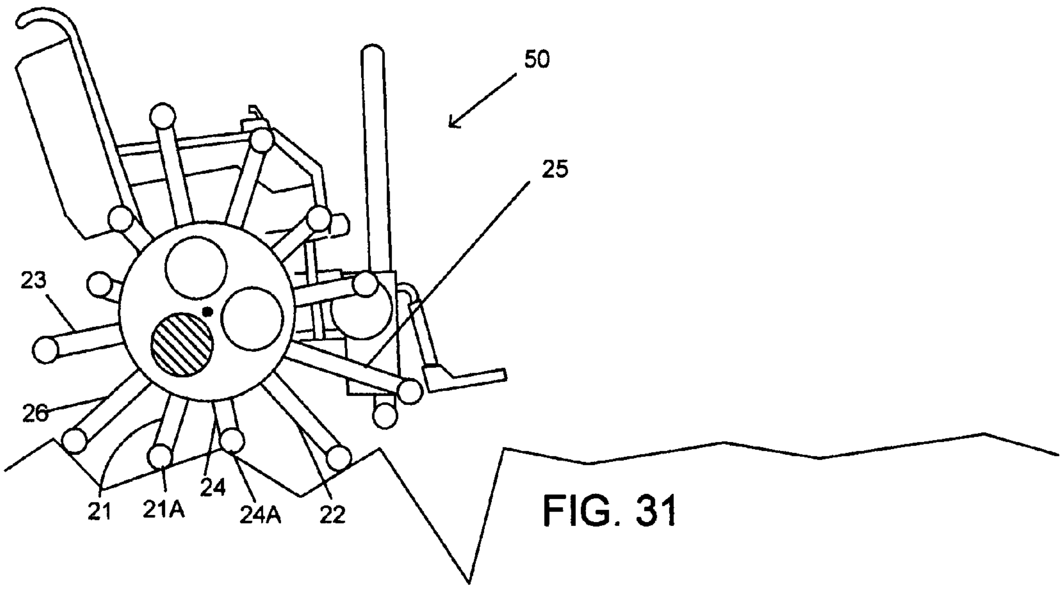
FIGS. 31-33 show an automated wheelchair moving over rough terrain.
Figure 32:
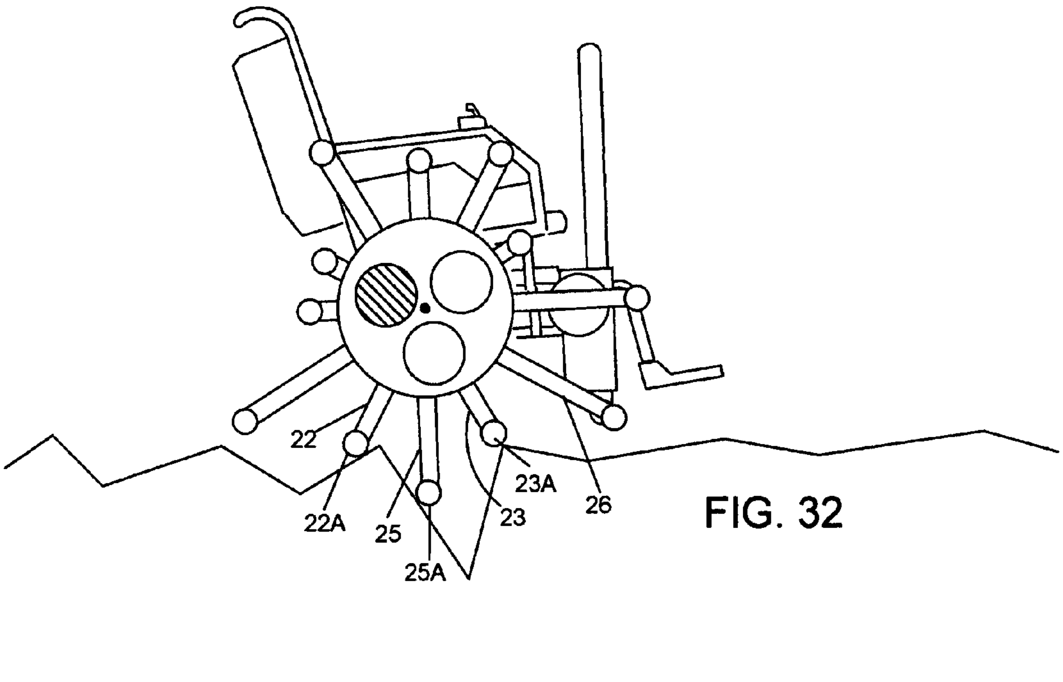
Figure 33:
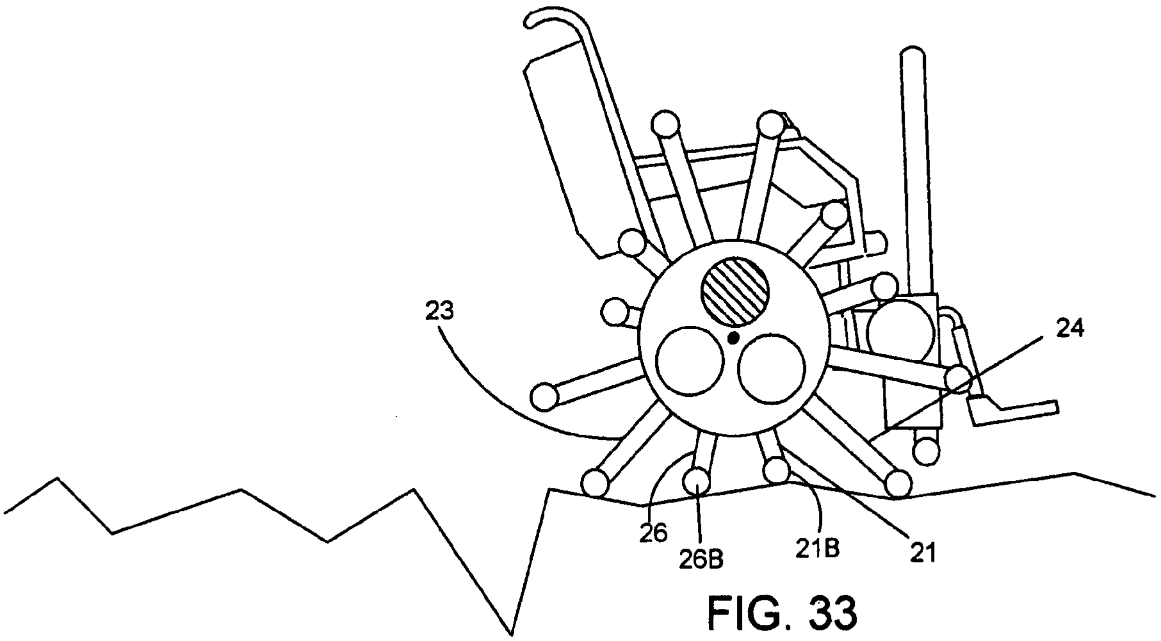

Wheelchair 50 is also capable of traveling over rough or uneven terrain, as shown in FIGS. 31-33.

In FIG. 31, wheelchair 50 is moving forward. Brakes are applied to wheels 21A and 24A.

In FIG. 32, wheelchair 50 is traveling over a ditch (or a pothole under one wheel).

Brakes are applied to wheels 23A, 25A and 22A.

In FIG. 33, wheelchair 50 has cleared the ditch and is continuing traveling over the rough terrain. Brakes are applied to wheels 26B and 21B.

Turning Left and Right

Figure 34:
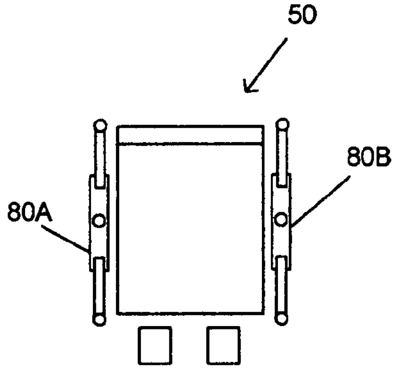
FIG. 34 shows a top view a preferred automated wheelchair.
Figure 35:
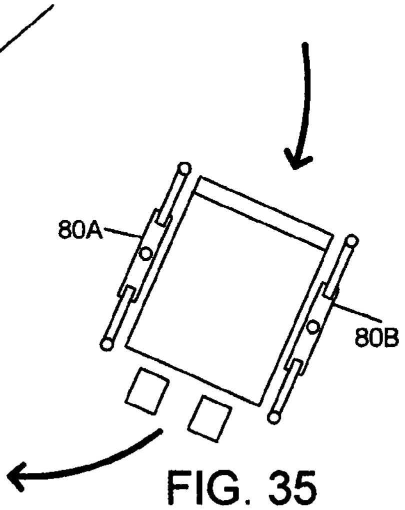
FIG. 35 shows an automated wheelchair turning right.
Figure 36:
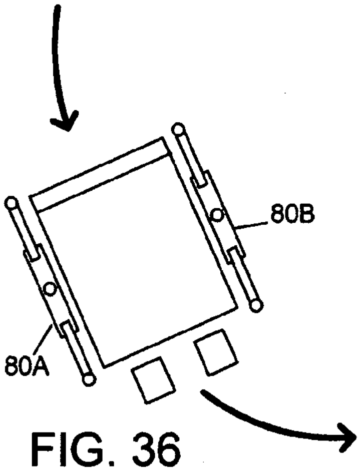
FIG. 36 shows an automated wheelchair turning left.

In a preferred embodiment, wheelchair 50 can be turned either left or right at the discretion of the operator (FIGS. 34-36). This turning can be done at anytime of operation enabling the operator to keep the chair centered in a stairway or negotiate a winding staircase. A set of mirrors will aid the operator while climbing stairs in reverse.

FIGS. 34-36 show a top view of wheelchair 50. In FIG. 35, the operator has moved the joystick on operator input device 1 (FIG. 1) to the right sending a signal to main computer controller 2. Main computer controller 2 controls motors 41-46 for wheels 80A and 80B so that wheel 80B turns faster than wheel 80A. This causes wheelchair 50 to turn to the operator's right.

In FIG. 36, the operator has moved the joystick on operator input device 1 (FIG. 1) to the left sending a signal to main computer controller 2. Main computer controller 2 controls motors 41-46 for wheels 80A and 80B so that wheel 80A turns faster than wheel 80B. This causes wheelchair 50 to turn to the operator's left.

Although the above-preferred embodiments have been described with specificity, persons skilled in this art will recognize that many changes to the specific embodiments disclosed above could be made without departing from the spirit of the invention. For example, although it was described above how two pneumatic wheels in contact with a floor surface or step surface had brakes applied for traction, it would also be possible to apply a brake to just one pneumatic wheel for traction or apply a brake to three pneumatic wheels for traction. Also, although the above preferred embodiment showed that operator input device included a joystick, the operator input device could be easily modified as appropriate. For example, it could include buttons for data entry or it could include voice recognition software. Voice recognition software would be preferable for operators who had no use of their hands or limited use of their hands. Also, although FIGS. 2-16 show a set of stairs with a typical uniform rise to run ratio, it should be understood that the above described preferred embodiments could also easily traverse a set of stairs with a non-uniform rise to run ratio. Also, the preferred embodiment can be utilized for traversing a set of curved stairs. Therefore, the attached claims and their legal equivalents should determine the scope of the invention.

What is claimed is:

1. An automated wheelchair comprising:

A) a operator chair for seating an operator,

B) two wheelchair wheels for propelling said wheelchair,

C) a programmable control computer,

D) an operator input device for receiving inputs from said operator and for transmitting said inputs to said programmable control computer, E) a plurality of extendable and retractable spokes attached to said two wheels, F) a plurality of contact sensor devices, at least one of said plurality of contact sensors attached to each end of each one of said plurality of spokes, wherein said programmable computer receives inputs from said plurality of contact sensors to continuously generate contact position data, G) a plurality of motors for controlling the extension and retraction of said plurality of extendable and retractable spokes, wherein said programmable control computer is programmed to generate and send control signals to said plurality of motors in response to said inputs from said operator and in response to said contact position data, wherein said plurality of motors drives said plurality of extendable and retractable spokes such that each extendable and retractable spoke extends and retracts on opposite sides of said wheelchair wheel, wherein said control signals from said programmable control computer cause said plurality of motors to extend and retract said plurality of extendable and retractable spokes wherein said extension and retraction of said plurality of extendable and retractable spokes propels said automated wheelchair over a contact surface.

2. The automated wheelchair as in claim 1, further comprising:

A) a plurality of rotatably attached spoke wheels, each rotatably attached spoke wheel attached to each end of said plurality of expandable and retractable spokes, B) a plurality of brakes for preventing the rotation of each of said plurality of rotatably attached spoke wheels, wherein at least one spoke wheel with brake applied per wheelchair wheel is in contact with said contact surface during said wheelchair movement.

3. The automated wheelchair as in claim 2, wherein said plurality of rotatably attached spoke wheels are pneumatic wheels.

4. The automated wheelchair as in claim 2, wherein two spoke wheels with brakes applied per wheelchair wheel is in contact with said contact surface during said wheelchair movement.

5. The automated wheelchair as in claim 1, wherein said operator chair is tiltable.

6. The automated wheelchair as in claim 1, wherein said wheelchair is powered by rechargeable batteries.

7. The automated wheelchair as in claim 1, wherein said operator input device comprises a joystick.

8. The automated wheelchair as in claim 1, wherein said operator input device comprises voice recognition software.

9. The automated wheelchair as in claim 1, wherein said plurality of extendable and retractable spokes extend and retract through the center of each of said wheelchair wheel.

10. The automated wheelchair as in claim 1, wherein said plurality of contact sensors are pressure sensors.

11. The automated wheelchair as in claim 1, further comprising two extendable and retractable safety spokes mounted towards the front of said wheelchair.

12. The automated wheelchair as in claim 11, wherein said extendable and retractable safety spokes receive control inputs from said programmable control computer.

13. The automated wheelchair as in claim 11, wherein said extendable and retractable safety spokes are automatically maintained at a distance slightly above said contact surface to prevent accidental tipping of said wheelchair.

14. The automated wheelchair as in claim 13 wherein said distance is approximately 2 inches.

15. The automated wheelchair as in claim 1, wherein said contact surface is a set of stairs.

16. The automated wheelchair as in claim 15, wherein said set of stairs comprises a non-uniform rise to run ratio.

17. The automated wheelchair as in claim 15, wherein said set of stairs is curved.

18. The automated wheelchair as in claim 1, wherein said contact surface is a curb.

19. The automated wheelchair as in claim 1, wherein said contact surface is rough terrain.

20. The automated wheelchair as in claim 1, wherein said wheelchair is capable of turning left or right based on inputs from said operator via said operator input device.

21. The automated wheelchair as in claim 1, wherein said plurality of extendable and retractable spokes are double acting.

* * * * *